(12) United States Patent
Lin et al.

(10) Patent No.: US 11,693,485 B1
(45) Date of Patent: Jul. 4, 2023

(54) METHOD FOR IMPROVING QUALITY OF VISUAL CONTENT, HOST, AND COMPUTER READABLE STORAGE MEDIUM

(71) Applicant: HTC Corporation, Taoyuan (TW)

(72) Inventors: Ting-Wei Lin, Taoyuan (TW); Min Chia Wei, Taoyuan (TW); Chien-Min Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/958,428

(22) Filed: Oct. 2, 2022

Related U.S. Application Data

(60) Provisional application No. 63/311,055, filed on Feb. 17, 2022.

(51) Int. Cl.
*G06F 3/01* (2006.01)

(52) U.S. Cl.
CPC .............. *G06F 3/017* (2013.01); *G06F 3/014* (2013.01)

(58) Field of Classification Search
None
See application file for complete search history.

(56) References Cited

U.S. PATENT DOCUMENTS

| | | | |
|---|---|---|---|
| 2014/0282274 A1* | 9/2014 | Everitt | G06F 3/0485 715/863 |
| 2022/0334649 A1* | 10/2022 | Hwang | G06V 40/28 |

* cited by examiner

*Primary Examiner* — Parul H Gupta
(74) *Attorney, Agent, or Firm* — JCIPRNET

(57) ABSTRACT

The embodiments of the disclosure provide a method for improving quality of a visual content, a host, and a computer readable storage medium. The method includes: determining a first gesture of a first hand and accordingly providing a first hand object in the visual content; determining a second gesture of a second hand and accordingly providing a second hand object in the visual content; in response to determining that the first gesture and the second gesture respectively correspond to a first predetermined gesture and a second predetermined gesture, determining a specific distance between the first gesture and the second gesture; and in response to determining that the specific distance is smaller than a distance threshold, refining the first hand object and the second hand object.

20 Claims, 5 Drawing Sheets

METHOD FOR IMPROVING QUALITY OF VISUAL CONTENT, HOST, AND COMPUTER READABLE STORAGE MEDIUM

CROSS-REFERENCE TO RELATED APPLICATION

This application claims the priority benefit of U.S. provisional application Ser. No. 63/311,055, filed on Feb. 17, 2022. The entirety of the above-mentioned patent application is hereby incorporated by reference herein and made a part of this specification.

BACKGROUND

1. Field of the Invention

The present disclosure generally relates to a method for improving quality of a visual content, a host, and a computer readable storage medium.

2. Description of Related Art

In technologies such as virtual reality (VR), mixed reality (MR), the hands of a user can be tracked and mapped as corresponding hand objects in the virtual world. Since the accuracy of the hand tracking may be unsatisfying due to some reasons (e.g., hands being occluded), the visual quality of the hand objects may be affected.

See FIG. 1, which shows a schematic diagram of gesture detection. In FIG. 1, the hands 111, 112 of the user in the real world can be tracked and respectively mapped as hand objects 121, 122 in the virtual world. Due to some reasons (such as occlusion), the hands 111, 112 may be inaccurately tracked, such that the corresponding hand objects 121, 122 may not be able to correctly reflect the real relative position between the hands 111, 112.

For example, when the user makes the hands 111, 112 do the gestures shown in FIG. 1 (e.g., making a triangle), the hand objects 121, 122 may be inaccurately rendered due to inaccurately determined distance between the hands 111, 112 and/or inaccurately determined depths of the hands 111 and/or 112, which makes the hand objects 121, 122 deviates from the real situations of the hands 111, 112. In this case, even though the user uses the hands 111, 112 to form a triangle, the hand objects 121, 122 may not be rendered to properly present the triangle desired by the user, which may degrade the visual experience of the user.

SUMMARY OF THE INVENTION

Accordingly, the disclosure is directed to a method for improving quality of a visual content, a host, and a computer readable storage medium, which may be used to solve the above technical problems.

The embodiments of the disclosure provide a method for improving quality of a visual content, adapted to a host. The method includes: determining a first gesture of a first hand and accordingly providing a first hand object in the visual content; determining a second gesture of a second hand and accordingly providing a second hand object in the visual content; in response to determining that the first gesture and the second gesture respectively correspond to a first predetermined gesture and a second predetermined gesture, determining a specific distance between the first gesture and the second gesture; and in response to determining that the specific distance is smaller than a distance threshold, refining the first hand object and the second hand object.

The embodiments of the disclosure provide a host including a storage circuit and a processor. The storage circuit stores a program code. The processor is coupled to the storage circuit and accesses the program code to perform: determining a first gesture of a first hand and accordingly providing a first hand object in a visual content; determining a second gesture of a second hand and accordingly providing a second hand object in the visual content; in response to determining that the first gesture and the second gesture respectively correspond to a first predetermined gesture and a second predetermined gesture, determining a specific distance between the first gesture and the second gesture; and in response to determining that the specific distance is smaller than a distance threshold, refining the first hand object and the second hand object.

The embodiments of the disclosure provide a computer readable storage medium, the computer readable storage medium recording an executable computer program, the executable computer program being loaded by a host to perform steps of: determining a first gesture of a first hand and accordingly providing a first hand object in a visual content; determining a second gesture of a second hand and accordingly providing a second hand object in the visual content; in response to determining that the first gesture and the second gesture respectively correspond to a first predetermined gesture and a second predetermined gesture, determining a specific distance between the first gesture and the second gesture; and in response to determining that the specific distance is smaller than a distance threshold, refining the first hand object and the second hand object.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1:
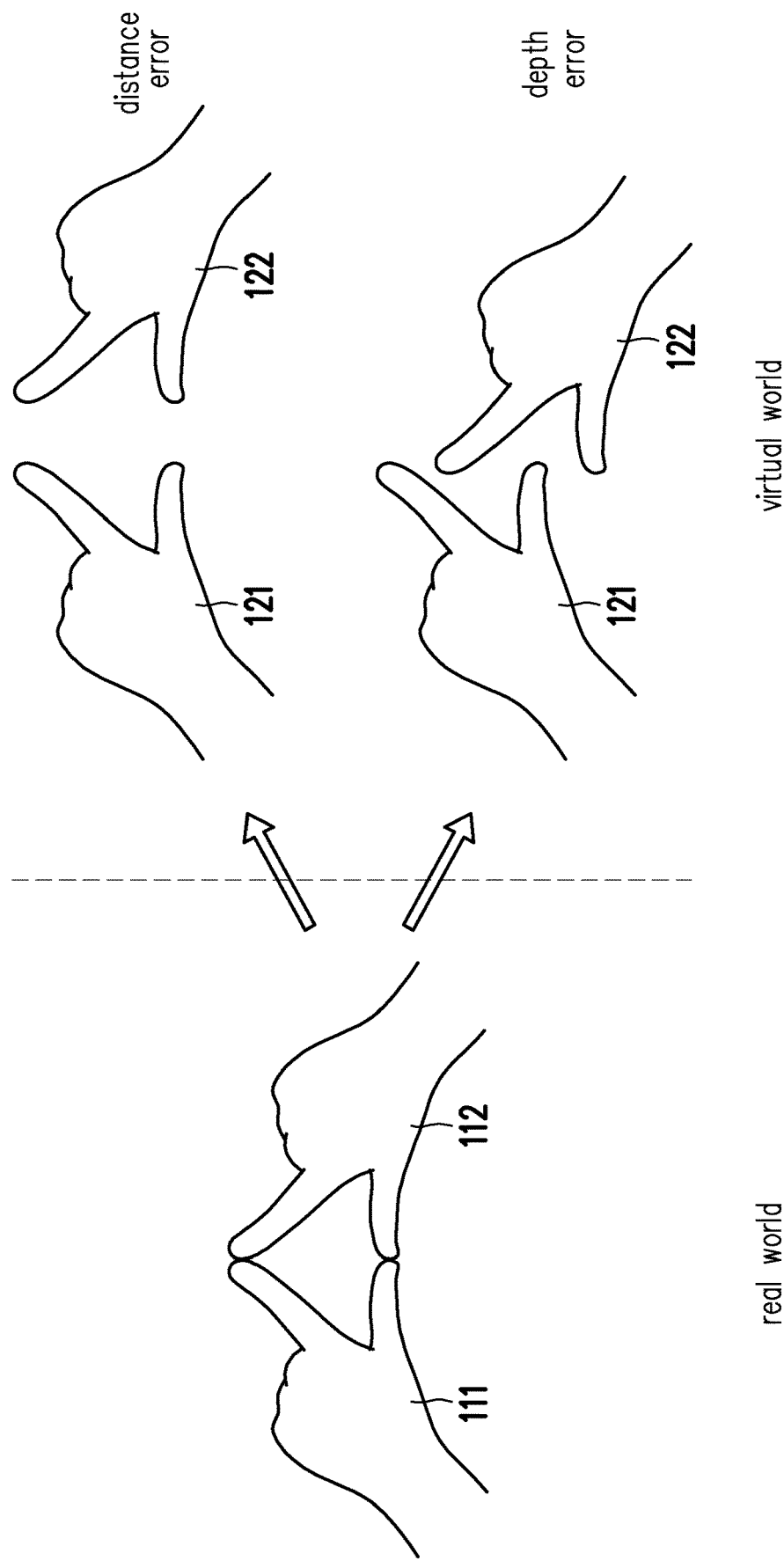
FIG. 1 shows a schematic diagram of gesture detection.

Reference will now be made in detail to the present preferred embodiments of the invention, examples of which are illustrated in the accompanying drawings. Wherever possible, the same reference numbers are used in the drawings and the description to refer to the same or like parts.

Figure 2:
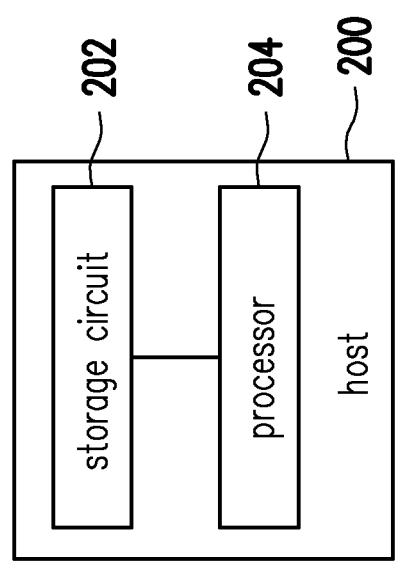
FIG. 2 shows a schematic diagram of a host according to an embodiment of the disclosure.

See FIG. 2, which shows a schematic diagram of a host according to an embodiment of the disclosure. In FIG. 2, the host 200 can be any device capable of tracking hand gestures of the user. In one embodiment, the host 200 can be a head-mounted display (HMD) that provides AR/VR services/contents. In some embodiments, the HMD can determine the gestures performed by the hands of the user via performing inside-out tracking mechanisms, but the disclosure is not limited thereto.

In some embodiments, the HMD can include a (front) camera having a field of view (FOV), and when the hands of the user are in the FOV of the camera, the HMD can track the hands and accordingly determined the gestures based on the images captured by the camera, but the disclosure is not limited thereto. In the disclosure, details of the inside-out tracking mechanism can be referred to the related prior arts, and the details thereof would not be further described.

In FIG. 2, the host 200 includes a storage circuit 202 and a processor 204. The storage circuit 202 is one or a combination of a stationary or mobile random access memory (RAM), read-only memory (ROM), flash memory, hard disk, or any other similar device, and which records a plurality of modules and/or program codes that can be executed by the processor 204.

The processor 204 is coupled with the storage circuit 202, and the processor 204 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In the embodiments of the disclosure, the processor 204 can access the modules/program codes stored in the storage circuit 202 to implement the method for improving quality of a visual content provided in the disclosure, which would be further discussed in the following.

Figure 3:
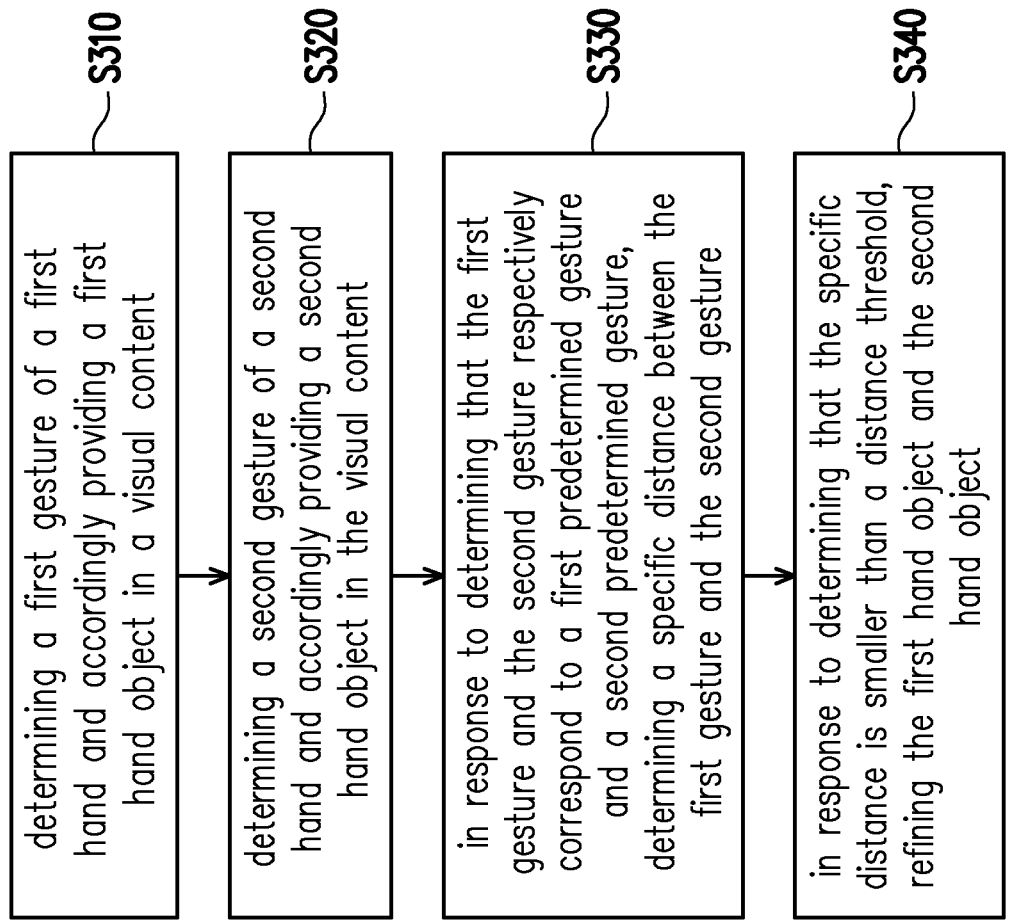
FIG. 3 shows a flow chart of the method for improving quality of a visual content according to an embodiment of the disclosure.
Figure 4:
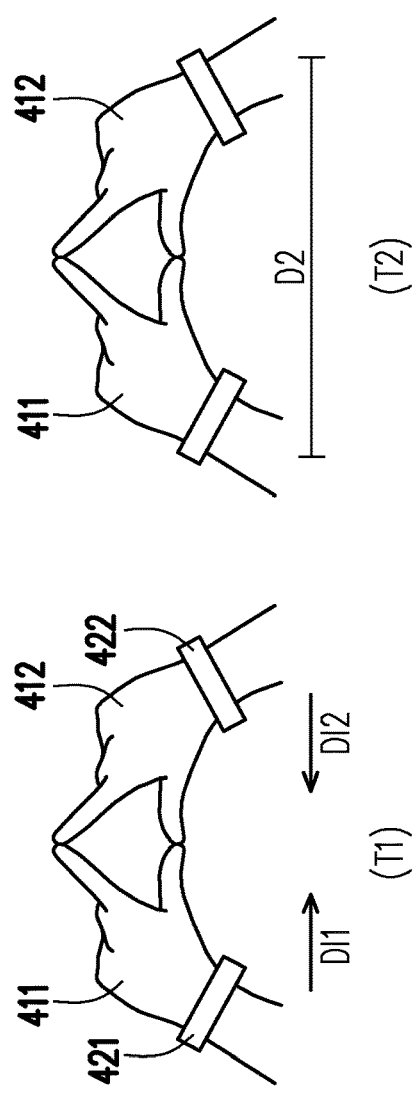
FIG. 4 shows a schematic diagram of the application scenario according to an embodiment of the disclosure.
Figure 4:
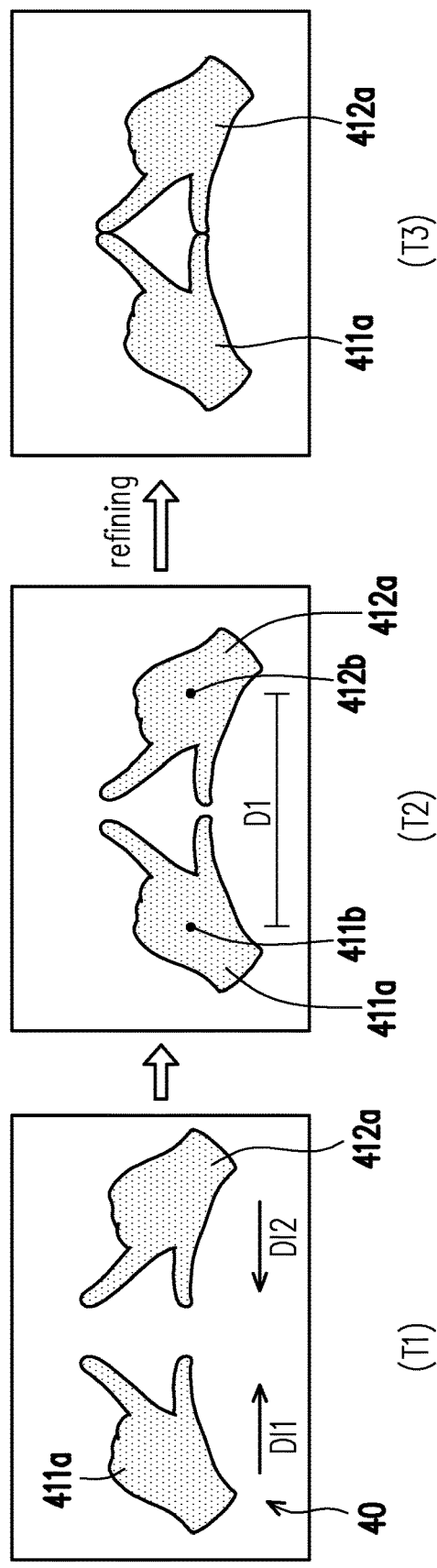

See FIG. 3, which shows a flow chart of the method for improving quality of a visual content according to an embodiment of the disclosure. The method of this embodiment may be executed by the host 200 in FIG. 2, and the details of each step in FIG. 3 will be described below with the components shown in FIG. 2. For better explaining the concept of the disclosure, FIG. 4 would be used as an example, wherein FIG. 4 shows a schematic diagram of the application scenario according to an embodiment of the disclosure.

In step S310, the processor 204 determines a first gesture of a first hand 411 and accordingly provides a first hand object 411a in a visual content 40. In step S320, the processor 204 determines a second gesture of a second hand 412 and accordingly provides a second hand object 412a in the visual content 40.

In various embodiments, the visual content 40 may be provided as a reality service of a reality system run on the host 200. In some embodiments, the reality system can be an augmented reality (AR) system, a VR system, an MR system, and/or an extended reality (XR) system, but the disclosure is not limited thereto. In some embodiments, the visual content 40 provided by the processor 204 can be the AR/VR/MR/XR contents shown by the HMD to the user of the HMD, and the first hand 411 and the second hand 412 may be the hands of the user of the host 200. In one embodiment, the visual content 40 can include a virtual environment with 360 degree view. In one embodiment, the processor 204 can provide a part of the visual content for the user to see with the FOV of the user, and the content in the FOV of the user can be adjusted at least in response to the pose of the HMD.

In the embodiments of the disclosure, the processor 204 can perform any existing hand gesture recognition algorithms to track the first hand gesture and the second hand gesture perform by the first hand 411 and the second hand 412 in the FOV of the camera of the HMD. In one embodiment, after obtaining the first gesture and the second gesture, the processor 204 can add/render the first hand object 411a and the second hand object 412a that respectively correspond to the first hand 411 and the second hand 412 into the visual content 40.

In one embodiment, the first gesture may be determined in a more accurate way by using wearable devices. For example, the first hand 411 may wear a first wearable device 421 (e.g., a smart bracelet), and the first wearable device 421 may be disposed with motion detecting elements (e.g., inertia measurement unit (IMU)) for collecting the motion data (e.g., 6 degree of freedom values and/or accelerations) of the first hand 411.

In one embodiment, the processor 204 may determine the gesture of the first hand 411 obtained based on the inside-out tracking mechanism as a first reference gesture of the first hand 411. In this case, the processor 204 may retrieve a plurality of historical gestures of the first hand 411 and the motion data of the first wearable device 421, and determine the first gesture of the first hand 411 via correcting the first reference gesture based on the historical gesture of the first hand 411 and the motion data. Accordingly, the processor 204 can determine the first gesture of the first hand 411 in a more accurate way by taking the motion data of the first wearable device 421 into consideration. Similarly, the second hand 412 may wear a second wearable device 422, and the processor 204 can determine the second gesture of the second hand 412 in a more accurate way by taking the motion data of the second wearable device 422 into consideration.

In one embodiment, the processor 204 can determine whether the first gesture and the second gesture respectively correspond to a first predetermined gesture and a second predetermined gesture.

In one embodiment, the first predetermined gesture and the second predetermined gesture belongs to a predefined gesture combination. In one embodiment, the host 200 may maintain a database for storing various predefined gesture combinations, and each predefined gesture combinations may include a pair of gestures.

Figure 5:
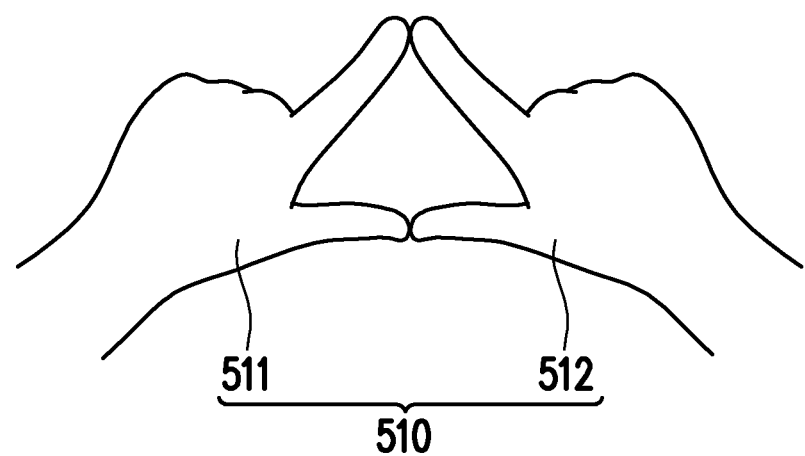
FIG. 5 shows a schematic diagram of predefined gesture combinations according to embodiments of the disclosure.
Figure 5:
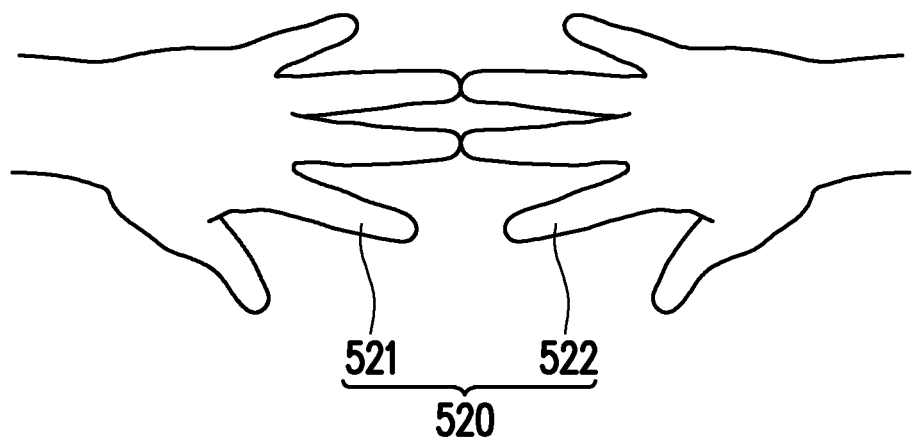
Figure 5:
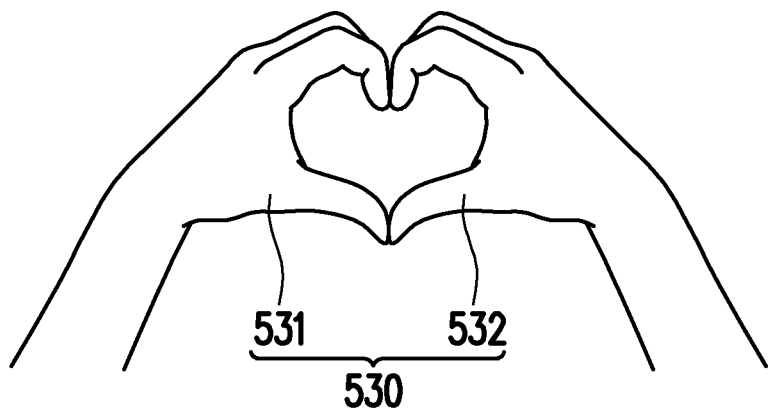

See FIG. 5, which shows a schematic diagram of predefined gesture combinations according to embodiments of the disclosure. In FIG. 5, the predefined gesture combinations 510, 520, 530 can be stored in the database, wherein the predefined gesture combination 510 may include a first predetermined gesture 511 and a second predetermined gesture 512, the predefined gesture combination 520 may include a first predetermined gesture 521 and a second predetermined gesture 522, and the predefined gesture combination 530 may include a first predetermined gesture 531 and a second predetermined gesture 532, but the disclosure is not limited thereto.

As shown in FIG. 5, the predetermined gestures in each predefined gesture combinations are symmetrical to each other. For example, the first predetermined gesture 511 and the second predetermined gesture 512 in predefined gesture combination 510 are symmetrical to each other; the first predetermined gesture 521 and the second predetermined gesture 522 in predefined gesture combination 520 are symmetrical to each other; the first predetermined gesture 531 and the second predetermined gesture 532 in predefined gesture combination 530 are symmetrical to each other. In other embodiments, the predetermined gestures in some predefined gesture combinations may be asymmetrical to each other, but the disclosure is not limited thereto.

In one embodiment, the processor 204 may determine whether the first gesture and the second gesture correspond to the predetermined gestures of any predefined gesture combination. In the scenario exemplarily shown in FIG. 4, the processor 204 may determine that the first gesture of the first hand 411 and the second gesture of the second hand 412 respectively corresponds to the first predetermined gesture 511 and the second predetermined gesture 512 of the predefined gesture combination 510 at a timing point T1. For example, the first hand 411 and the second hand 412 may approach to each other along the corresponding directions DI1 and DI2 until the index fingers and thumbs on the first hand 411 and the second hand 412 form a triangle, but the disclosure is not limited thereto. Accordingly, the processor 204 may adjust the first hand object 411a and the second hand object 412a to be corresponding to the first gesture and the second gesture at the timing point T1. That is, the processor 204 may move the first hand object 411a and the second hand object 412a toward each other along the corresponding directions DI1 and DI2, but the disclosure is not limited thereto.

In the embodiments of the disclosure, the predefined gesture combinations 510, 520, 530 can be used to activate various system functions. For example, the predefined gesture combination 510 may be used to show a system menu of the reality system, the predefined gesture combination 530 may be used to send/show a heart-shaped emoji, but the disclosure is not limited thereto.

In FIG. 4, the user may be assumed to use the first hand 411 and the second hand 412 to present the predefined gesture combination 510 at a timing point T2, but the disclosure is not limited thereto.

In step S330, in response to determining that the first gesture and the second gesture respectively correspond to the first predetermined gesture 511 and second predetermined gesture 512, the processor 204 determines a specific distance between the first gesture and the second gesture.

In the embodiments of the disclosure, since the first hand object 411a and the second hand object 412a are respectively rendered based on the first gesture and the second gesture, the specific distance between the first gesture and the second gesture can be regarded as corresponding to a distance between the first hand object 411a and the second hand object 412a, but the disclosure is not limited thereto.

In one embodiment, the specific distance may be a shortest distance between the first gesture and the second gesture. For example, the processor 204 may regard the distance between the index fingers on the first hand 411 and the second hand 412 as the specific distance.

In another embodiment, the specific distance may be a first distance between a first reference point on the first gesture and a second reference point on the second gesture. In this case, the first reference point on the first gesture may be any point on the first gesture desired by the designer, and the second reference point on the second gesture may be any point on the second gesture desired by the designer. In FIG. 4, the first reference point may be the center 411b of the palm of the first hand 411, the second reference point may be the center 412b of the palm of the second hand 412, and the specific distance may be a first distance D1 between the center 411b of the palm of the first hand 411 and the center 412b of the palm of the second hand 412.

In yet another embodiment, the specific distance may be a second distance D2 between the first wearable device 421 worn on the first hand 411 and the second wearable device 422 worn on the second hand 412, but the disclosure is not limited thereto.

In one embodiment, the processor 204 may determine whether the specific distance (e.g., the first distance D0 is smaller than a distance threshold. If yes, it represents that the user may be actually presenting the predefined gesture combination 510, even though the first hand object 411a and the second hand object 412a may not be accurately rendered to reflect the actual situation at the timing point T2. More specifically, as shown in FIG. 4, the first hand object 411a and the second hand object 412a at the timing point T2 may be slightly apart from each other at the timing point T2, which deviates from the actual relative position between the first hand 411 and the second hand 412 in the real world at the timing point T2.

Accordingly, in step S340, in response to determining that the specific distance is smaller than the distance threshold, the processor 204 refines the first hand object 411a and the second hand object 412a.

In one embodiment, the processor 204 may move the first hand object 411a and the second hand object 412a to be closer to each other when refining the first hand object 411a and the second hand object 412a. That is, the processor 204 may shorten the distance between the first hand object 411a and the second hand object 412a.

As mentioned in the above, the first hand object 411a and the second hand object 412a may be inaccurately rendered due to distance error and/or depth error, such that the first hand object 411a and the second hand object 412a may be farther from each other than the situation in the real world. By moving the first hand object 411a and the second hand object 412a to be closer to each other, the visual effect presented by the first hand object 411a and the second hand object 412a may be closer to the actual situation of the first hand 411 and the second hand 412.

In one embodiment, during moving the first hand object 411a and the second hand object 412a to be closer to each other, the processor 204 may move a first predetermined point on the first hand object 411a and a second predetermined point on the second hand object 412a to be closer to each other.

In the embodiments of the disclosure, the first predetermined point and the second predetermined point can be arbitrarily determined based on the requirements of the designer. That is, the first predetermined point can be any point on the first hand object 411a preferred by the designer, and the second predetermined point can be any point on the second hand object 412a preferred by the designer.

In one embodiment, the first predetermined point on the first hand object 411a may be a first joint point (e.g., fingertips and/or knuckles) on the first hand object 411a, and the second predetermined point on the second hand object 412a may be a second joint point (e.g., fingertips and/or knuckles) on the second hand object 412a.

In one embodiment, the first predetermined point and the second predetermined point can be determined based on the considered predefined gesture combination.

For a first embodiment, since the fingertips of the index fingers of the first hand 411 and the second hand 412 need to touch each other in the predefined gesture combination 510, the fingertips of index fingers on the first hand object 411a and the second hand object 412a may be respectively regarded as the first predetermined point and the second predetermined point. In this case, the processor 204 may shorten the distance between the fingertips of index fingers on the first hand object 411a and the second hand object 412a during moving the first hand object 411a and the second hand object 412a to be closer to each other.

For a second embodiment, since the fingertips of the thumbs of the first hand 411 and the second hand 412 need to touch each other in the predefined gesture combination 510, the fingertips of the thumbs on the first hand object 411a and the second hand object 412a may be respectively regarded as the first predetermined point and the second predetermined point. In this case, the processor 204 may shorten the distance between the fingertips of the thumbs on the first hand object 411a and the second hand object 412a during moving the first hand object 411a and the second hand object 412a to be closer to each other.

In a third embodiment, the processor 204 may simultaneously perform the operations introduced in the first embodiment and the second embodiment. That is, during refining the first hand object 411a and the second hand object 412a, the processor 204 may simultaneously shorten the distance between the fingertips of the index fingers on the first hand object 411a and the second hand object 412a and shorten the distance between the fingertips of the thumbs on the first hand object 411a and the second hand object 412a, but the disclosure is not limited thereto.

For a fourth embodiment, since the fingertips of the middle fingers of the first hand 411 and the second hand 412 need to touch each other in the predefined gesture combination 520, the fingertips of middle fingers on the first hand object 411a and the second hand object 412a may be respectively regarded as the first predetermined point and the second predetermined point. In this case, the processor 204 may shorten the distance between the fingertips of middle fingers on the first hand object 411a and the second hand object 412a during moving the first hand object 411a and the second hand object 412a to be closer to each other.

For a fifth embodiment, since the fingertips of the ring fingers of the first hand 411 and the second hand 412 need to touch each other in the predefined gesture combination 520, the fingertips of the ring fingers on the first hand object 411a and the second hand object 412a may be respectively regarded as the first predetermined point and the second predetermined point. In this case, the processor 204 may shorten the distance between the fingertips of the ring fingers on the first hand object 411a and the second hand object 412a during moving the first hand object 411a and the second hand object 412a to be closer to each other.

In a sixth embodiment, the processor 204 may simultaneously perform the operations introduced in the fourth embodiment and the fifth embodiment. That is, during refining the first hand object 411a and the second hand object 412a, the processor 204 may simultaneously shorten the distance between the fingertips of the middle fingers on the first hand object 411a and the second hand object 412a and shorten the distance between the fingertips of the ring fingers on the first hand object 411a and the second hand object 412a, but the disclosure is not limited thereto.

For a seventh embodiment, since the fingertips of the thumbs of the first hand 411 and the second hand 412 need to touch each other in the predefined gesture combination 530, the fingertips of thumbs on the first hand object 411a and the second hand object 412a may be respectively regarded as the first predetermined point and the second predetermined point. In this case, the processor 204 may shorten the distance between the fingertips of thumbs on the first hand object 411a and the second hand object 412a during moving the first hand object 411a and the second hand object 412a to be closer to each other.

For an eighth embodiment, since the fingertips of the index fingers of the first hand 411 and the second hand 412 need to touch each other in the predefined gesture combination 530, the fingertips of the index fingers on the first hand object 411a and the second hand object 412a may be respectively regarded as the first predetermined point and the second predetermined point. In this case, the processor 204 may shorten the distance between the fingertips of the index fingers on the first hand object 411a and the second hand object 412a during moving the first hand object 411a and the second hand object 412a to be closer to each other.

In a ninth embodiment, the processor 204 may simultaneously perform the operations introduced in the seventh embodiment and the eighth embodiment. That is, during refining the first hand object 411a and the second hand object 412a, the processor 204 may simultaneously shorten the distance between the fingertips of the thumbs on the first hand object 411a and the second hand object 412a and shorten the distance between the fingertips of the index fingers on the first hand object 411a and the second hand object 412a, but the disclosure is not limited thereto.

In one embodiment, during refining the first hand object 411a and the second hand object 412a, the processor 204 may stick the first predetermined point on the first hand object 411a with the second predetermined point on the second hand object 412a.

In one embodiment, the processor 204 may directly set the coordinates of the first predetermined point and the second predetermined point to be adjacent or the same, such that the first predetermined point and the second predetermined point can seem like touching each other.

In one embodiment, the processor 204 may shorten the distance between the first predetermined point and the second predetermined point to be a specific value, such that the first predetermined point with the second predetermined point can seem like sticked to each other or slightly overlapped on each other. In one embodiment, the specific value can be chosen to make the contours corresponding to the first predetermined point and the second predetermined point touch each other.

Taking the first embodiment as an example, during sticking the fingertips of index fingers on the first hand object 411a and the second hand object 412a (i.e., sticking the first predetermined point and the second predetermined point), the processor 204 may shorten the distance between the fingertips of the index fingers on the first hand object 411a and the second hand object 412a to be a specific value to make the contours of the index fingers on the first hand object 411a and the second hand object 412a touch each other.

Taking the second embodiment as an example, during sticking the fingertips of the thumbs on the first hand object 411a and the second hand object 412a (i.e., sticking the first predetermined point and the second predetermined point), the processor 204 may shorten the distance between the fingertips of the thumbs on the first hand object 411a and the second hand object 412a to be a specific value to make the contours of the thumbs on the first hand object 411a and the second hand object 412a slightly overlap on each other.

In the third embodiment, the processor 204 can simultaneously stick the fingertips of the index fingers on the first hand object 411a and the second hand object 412a and stick the fingertips of the thumbs on the first hand object 411a and the second hand object 412a. Accordingly, the visual effect shown in FIG. 4 at a timing point T3 can be presented to the user. In this case, the user would see the first hand object 411a and the second hand object 412a properly reflecting the situation of the first hand 411 and the second hand 412 in the real world. That is, the visual experience of the user would not be affected by the inaccurately rendered hand objects, such as the first hand object 411a and the second hand object 412a corresponding to the timing point T2.

In one embodiment, in response to determining that the specific distance is smaller than the distance threshold, it represents that the user may want to perform the predefined gesture combination corresponding to the first predetermined gesture and the second predetermined gesture determined in step S330. Accordingly, the processor 204 may activate the system function corresponding to the predefined gesture combination.

For example, if the first predetermined gesture and the second predetermined gesture determined in step S330 are respectively the first predetermined gesture 511 and the second predetermined gesture 512 in FIG. 5, the processor 204 may activate the system function (e.g., showing the system menu of the reality system) corresponding to the predefined gesture combination 510 in response to determining that the specific distance is smaller than the distance threshold.

For another example, if the first predetermined gesture and the second predetermined gesture determined in step S330 are respectively the first predetermined gesture 531 and the second predetermined gesture 532 in FIG. 5, the processor 204 may activate the system function (e.g., sending/showing a heart-shaped emoji) corresponding to the predefined gesture combination 530 in response to determining that the specific distance is smaller than the distance threshold, but the disclosure is not limited thereto.

The disclosure further provides a computer readable storage medium for executing the method for improving quality of a visual content. The computer readable storage medium is composed of a plurality of program instructions (for example, a setting program instruction and a deployment program instruction) embodied therein. These program instructions can be loaded into the host 200 and executed by the same to execute the method for improving quality of a visual content and the functions of the host 200 described above.

In summary, the embodiments of the disclosure can refine the hand objects in the visual content in response to determining that the gestures of the hands correspond to predetermined gestures and are close to each other. Accordingly, the quality of the visual content can be improved, such that the user can see the hand objects in the visual content properly reflecting the situation of the hands tracked in the real world. That is, the visual experience of the user would not be affected by the inaccurately rendered hand objects.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for improving quality of a visual content, adapted to a host, comprising:
   determining a first gesture of a first hand and accordingly providing a first hand object in the visual content;
   determining a second gesture of a second hand and accordingly providing a second hand object in the visual content;
   in response to determining that the first gesture and the second gesture respectively correspond to a first predetermined gesture and a second predetermined gesture, determining a specific distance between the first gesture and the second gesture; and
   in response to determining that the specific distance is smaller than a distance threshold, refining the first hand object and the second hand object.

2. The method according to claim 1, wherein the step of refining the first hand object and the second hand object comprises:
   moving the first hand object and the second hand object to be closer to each other.

3. The method according to claim 2, wherein the step of moving the first hand object and the second hand object to be closer to each other comprises:
   moving a first predetermined point on the first hand object and a second predetermined point on the second hand object to be closer to each other.

4. The method according to claim 3, wherein the step of moving the first predetermined point on the first hand object and the second predetermined point on the second hand object to be closer to each other comprises:
   sticking the first predetermined point on the first hand object with the second predetermined point on the second hand object.

5. The method according to claim 3, wherein the first predetermined point on the first hand object is a first joint point on the first hand object, and the second predetermined point on the second hand object is a second joint point on the second hand object.

6. The method according to claim 1, wherein the specific distance is a shortest distance between the first gesture and the second gesture.

7. The method according to claim 1, wherein the specific distance is a first distance between a first reference point on the first gesture and a second reference point on the second gesture.

8. The method according to claim 1, wherein the specific distance is a second distance between a first wearable device worn on the first hand and a second wearable device worn on the second hand.

9. The method according to claim 1, wherein the first predetermined gesture and the second predetermined gesture belongs to a predefined gesture combination.

10. The method according to claim 9, further comprising:
    activating a specific system function corresponding to the predefined gesture combination.

11. The method according to claim 1, wherein the first predetermined gesture is symmetrical to the second predetermined gesture.

12. The method according to claim 1, wherein the step of determining the first gesture of the first hand comprises:
    retrieving a plurality of historical gestures of the first hand;
    retrieving a motion data of a first wearable device worn on the first hand;
    determining a first reference gesture of the first hand;
    determining the first gesture of the first hand via correcting the first reference gesture based on the historical gesture of the first hand and the motion data.

13. The host according to claim 1, wherein the first predetermined gesture and the second predetermined gesture belongs to a predefined gesture combination, and the processor further activates a specific system function corresponding to the predefined gesture combination.

14. A host, comprising:
    a non-transitory storage circuit, storing a program code;
    a processor, coupled to the non-transitory storage circuit and accessing the program code to perform:
      determining a first gesture of a first hand and accordingly providing a first hand object in a visual content;

determining a second gesture of a second hand and accordingly providing a second hand object in the visual content;

in response to determining that the first gesture and the second gesture respectively correspond to a first predetermined gesture and a second predetermined gesture, determining a specific distance between the first gesture and the second gesture; and in response to determining that the specific distance is smaller than a distance threshold, refining the first hand object and the second hand object.

15. The host according to claim 14, wherein the processor performs:

moving the first hand object and the second hand object to be closer to each other.

16. The host according to claim 15, wherein the processor performs:

moving a first predetermined point on the first hand object and a second predetermined point on the second hand object to be closer to each other.

17. The host according to claim 16, wherein the processor performs:

sticking the first predetermined point on the first hand object with the second predetermined point on the second hand object.

18. The host according to claim 16, wherein the first predetermined point on the first hand object is a first joint point on the first hand object, and the second predetermined point on the second hand object is a second joint point on the second hand object.

19. The host according to claim 14, wherein the specific distance is a shortest distance between the first gesture and the second gesture, a first distance between a first reference point on the first gesture and a second reference point on the second gesture, or a second distance between a first wearable device worn on the first hand and a second wearable device worn on the second hand.

20. A non-transitory computer readable storage medium, the computer readable storage medium recording an executable computer program, the executable computer program being loaded by a host to perform steps of:

determining a first gesture of a first hand and accordingly providing a first hand object in a visual content;

determining a second gesture of a second hand and accordingly providing a second hand object in the visual content;

in response to determining that the first gesture and the second gesture respectively correspond to a first predetermined gesture and a second predetermined gesture, determining a specific distance between the first gesture and the second gesture; and in response to determining that the specific distance is smaller than a distance threshold, refining the first hand object and the second hand object.

* * * * *